(12) United States Patent
Nishiguchi

(10) Patent No.: US 6,650,393 B1
(45) Date of Patent: Nov. 18, 2003

(54) LIQUID CRYSTAL LIGHT MODULATING DEVICE AND A METHOD FOR MANUFACTURING SAME

(75) Inventor: Kenji Nishiguchi, Ikoma (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/434,326

(22) Filed: Nov. 4, 1999

(30) Foreign Application Priority Data

Nov. 11, 1998 (JP) .......................................... 10-320959

(51) Int. Cl.⁷ ................................................ G02F 1/13
(52) U.S. Cl. ..................................................... 349/156
(58) Field of Search ............................ 349/186, 155, 349/156

(56) References Cited

U.S. PATENT DOCUMENTS

| | | | |
|---|---|---|---|
| 4,249,800 A | 2/1981 | Spruijt | 350/320 |
| 5,285,304 A | 2/1994 | Hotta et al. | 359/81 |
| 5,473,450 A | 12/1995 | Yamada et al. | 359/51 |
| 5,621,553 A * | 4/1997 | Nishiguchi et al. | 349/153 |
| 5,682,218 A | 10/1997 | Shimizu et al. | 349/156 |
| 5,766,694 A * | 6/1998 | West et al. | 427/510 |
| 5,831,703 A * | 11/1998 | Nishiguchi et al. | 349/117 |

FOREIGN PATENT DOCUMENTS

| | | |
|---|---|---|
| JP | 61-190313 | 8/1986 |
| JP | 62-203123 | 9/1987 |
| JP | 08-110524 | 4/1996 |
| JP | 09-127528 | 5/1997 |
| JP | 09-258233 | 10/1997 |

* cited by examiner

Primary Examiner—James Dudek
(74) Attorney, Agent, or Firm—Sidley Austin Brown & Wood LLP

(57) ABSTRACT

Disclosed is a liquid crystal light modulating device and method for amufacturing the same. The liquid crystal light modulating device has a plurality of resin columns adhering two substrates between which a liquid crystal material is filled. The resin columns are arranged in a predetermined arrangement within a display region of the device. Each columns is made from a curable resin material as a main component, and forms a macromolecular material having thermoplasticity after curing.

16 Claims, 10 Drawing Sheets

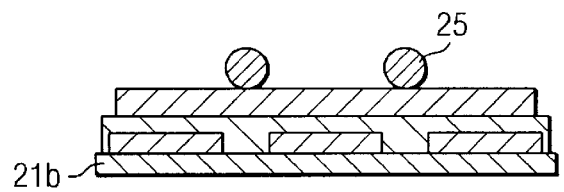
*FIG. 6G*
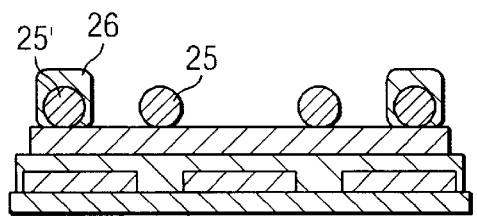
*FIG. 6H*
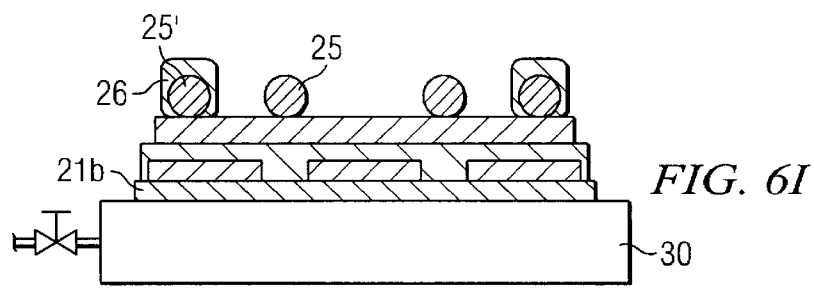
*FIG. 6I*
*FIG. 6J*
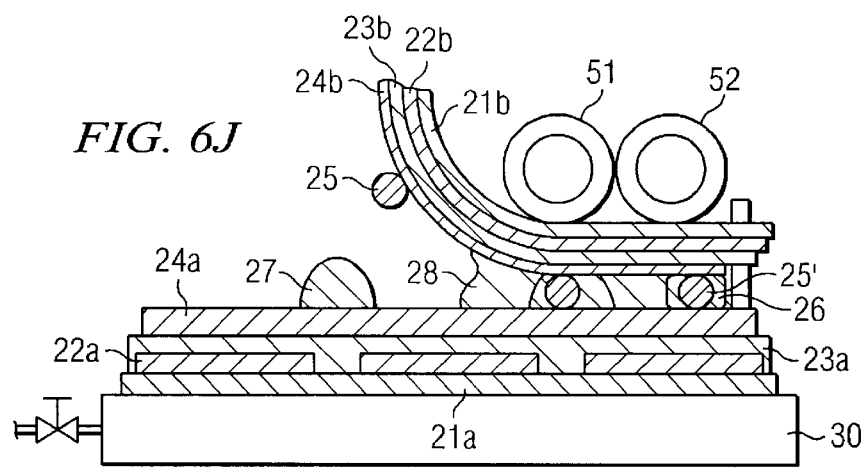
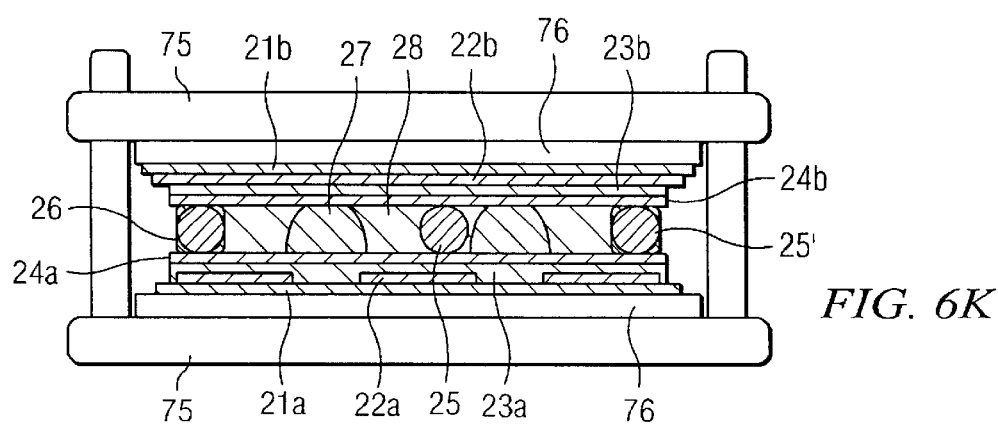
*FIG. 6K*

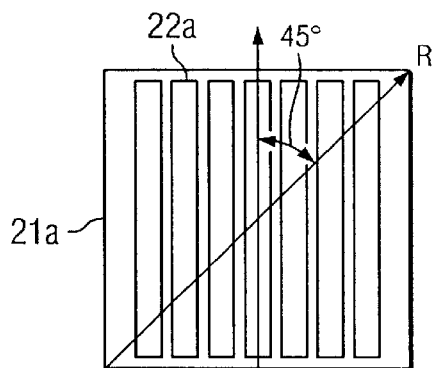 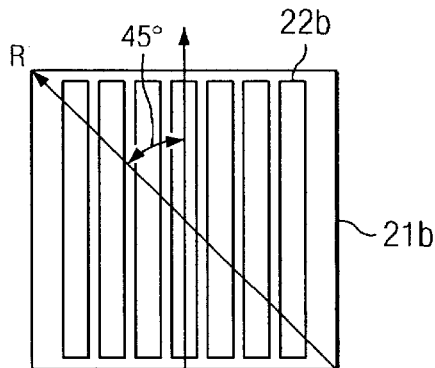
*FIG. 7A*     *FIG. 7B*
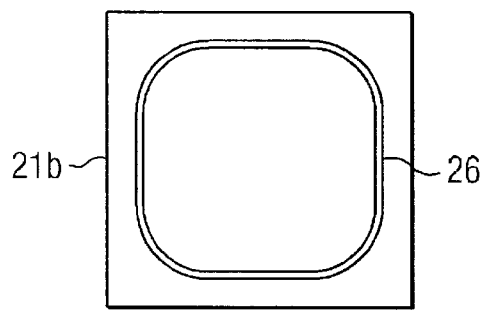
*FIG. 8*
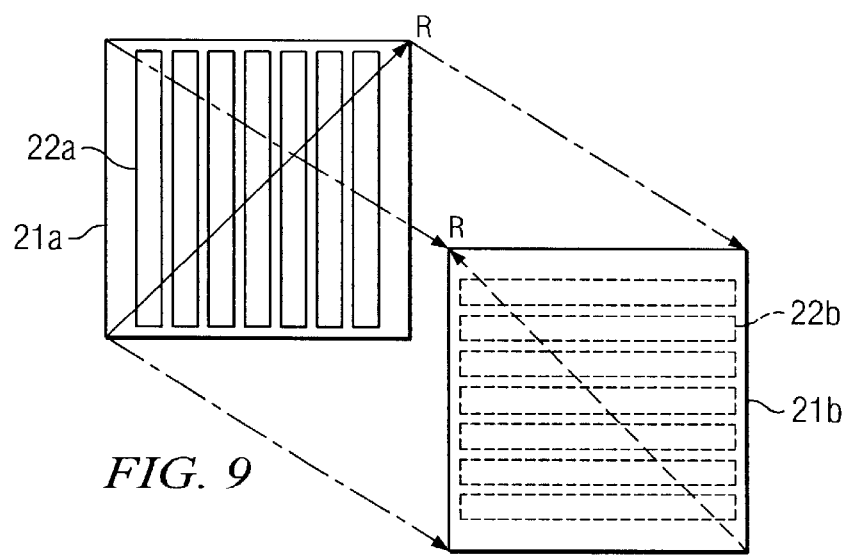
*FIG. 9*

LIQUID CRYSTAL LIGHT MODULATING DEVICE AND A METHOD FOR MANUFACTURING SAME

CROSS-REFERENCE TO RELATED APPLICATIONS

This application is based on Japanese Patent Application No. 10-320959 filed on Nov. 11, 1998, the content of which is hereby incorporated by reference.

BACKGROUND OF THE INVENTION

1. Field of the Invention

This invention relates to a liquid crystal light modulating device using a liquid crystal material interposed between a pair of substrates, and a method for manufacturing same.

2. Description of Related Art

Conventional light modulating devices are widely known which interpose a liquid crystal material between two substrates and use the liquid crystal material as a light shutter. This type of light modulating device is used, for example, as a display device. This type of display device is used as a display in various devices, foremostly, for example, in notebook style personal computer displays and portable telephone displays. Liquid crystal display devices characteristically are thin in design and have low power consumption, and are widely used in portable devices having a small surface area. In recent years, however, such displays have been developed for large screen displays used in built-in in-wall televisions and as replacements for CRT monitors.

Maintaining a uniform gap between substrates has become more important in conjunction with achieving higher quality and larger surface area liquid crystals. Heretofore, it has been difficult to regulate sufficient uniformity of the inter substrate gap within a light modulation range, with resultant disadvantages including display defects which make it difficult to achieve high quality displays. Management of the flatness of the inter substrate gap is directly concerning with a parameter which defines the display quality particularly in liquid crystal display devices using ferrodielectric liquid crystals, and reflective type liquid crystal display devices using liquid crystals which exhibits a cholesteric phase (i.e., chiral nematic liquid crystals). In ferrodielectric liquid crystals, irregularities in the inter substrate gap cause irregularities in the orientation of the liquid crystals which reduces the display quality. When driving an element which has a memory such as cholesteric liquid crystals, the display irregularities become pronounced due to the reduced threshold characteristics.

Art related to controlling the inter substrate gap is known, e.g., U.S. Pat. No. 4,249,800. This United States patent discloses a liquid crystal display which uses glass beads coated with a thermoplastic resin as spacers. Specifically, the glass beads are dispersed in a photosensitive lacquer, and applied on a substrate, then the glass beads are arranged on the substrate by a so-called photolithographic method which includes masked light exposure and developing.

In the method described in this United States patent, first, manufacturing or preparation of the resin-coated glass beads which requires a labor is necessary. Furthermore, a large amount of the spacers are wastefully removed from the substrate during the photolithographic method. In addition, productivity is low due to the extreme complexity of the various processes such as the required developing process. Since only part of the surface coating layer of the spacers comes into contact with the substrate, adequate adhesion cannot be obtained. Since the spacers themselves are small it is difficult to accurately arrange these spacers at optional positions, essentially making it difficult to eliminate display irregularities.

U.S. Pat. No. 5,285,304 discloses a ferroelectric liquid crystal display in which two substrates, on which adhesive thermosetting polymer particles and nonadhesive thermoplastic polymer particles having a diameter approximately 1.5~5 times the thickness of the liquid crystal layer are dispersed, are pressed each other. Japanese Laid-Open Patent Application No. 8-110524 discloses a method wherein a gap control member which is not deformable even when heated and a gap control member supplying adhesive force to both substrates when hardened after being melted or softened by heating are applied on substrates, and the latter gap controller adheres to both substrates when melted or heated above the softening temperature.

In the methods disclosed in the aforesaid two publications, it is essentially impossible to arrange the gap controller or polymer particles adhering to the substrate at a desired position because, the polymer particles or gap controller are arranged dispersion. Accordingly, when dispersing these materials, the polymer particles or gap controllers easily start to flocculate. As a result, the locations of such flocculation readily produce defects in the orientation of the liquid crystal, and produce regions where light is unmodulated such that a display of sufficiently high quality cannot be obtained.

In contrast, Japanese Laid-Open Patent Application No. 9-258233 proposes a liquid crystal display device wherein spacers are adhered to a pair of substrates by an ultraviolet-curing resin. The arrangement of the spacers on the substrates is accomplished by a silkscreen printing method wherein the spacers are mixed in an ultraviolet-curing resin beforehand. Thereafter, the opposite substrate is overlaid and the ultraviolet-curing resin is hardened by exposure to ultraviolet light. However, sufficient adhesion force is not obtained even when both substrates are adhered inasmuch as the cross section area of the spacers is too small. Furthermore, in general, ultraviolet-curing resin is soft when in an uncured state, such that when the two substrates are overlaid, even a slight dislocation of the substrates may move the oriented spacers and the ultraviolet-curing resin. At this time the ultraviolet-curing resin broadens the interface between the liquid crystal and the substrates so as to cause orientation defects of the liquid crystal in the regions of the broadened ultraviolet-curing resin.

Japanese Laid-Open Patent Application No. 62-203123 discloses a liquid crystal display device using high polymer resin dams continuously arrayed in a matrix across the entire surface of a transparent flexible substrate rather than the particle-like spacers of the conventional art. The purpose of forming resin dams described in this publication is to adhere the resin dams to as long flexible substrate, and cut them to an optional size. According to this publication, an adhesion force is generated between the substrates and the resin damns under light pressure; specifically, an example is given wherein the resin dams are formed by an offset printing method using ultraviolet-curing resin, or photolithographic method using a photoresist, and adhered to the substrates under light pressure at approximately 80° C.

Even when the resin dams are formed in a matrix pattern, for example, it is difficult to realize an accurate inter substrate gap only by the resin dams. In the aforesaid example, since the formed resin structure itself comprises UV-curing resin, sufficient adhesion is not achieved by light pressure on the substrates at approximately 80° C. Accordingly, there is high concern of inter substrate gap fluctuation due to rapid temperature change or external pressure, which will disadvantageously prevent proper light modulation by the liquid crystal layer.

From the perspective of imparting adhesion to the resin structure, a method is proposed wherein the resin structure is formed which is in contact with a pair of substrates using a photopolymerizable material. For example, U.S. Pat. No. 5,473,450 discloses a liquid crystal display device wherein a resin wall is formed by photopolymerization phase separation using a photomask. U.S. Pat. No. 5,682,218 discloses resin columns formed by separating the liquid crystal and uncured resin by cooling a mixture of liquid crystal in isotropic phase and resin (monomer), and thereafter heating or UV-curing the uncured resin.

In methods using photopolymerizable materials, uncured monomer and polymerization initiator may remain within the liquid crystal even after polymerization, thereby disadvantageously affecting the operating characteristics and contrast of the liquid crystal. Furthermore, irregularities readily occur in the constituents of the resin structure itself so as to affect the inter substrate gap.

On the other hand, vacuum injection methods are used in methods for manufacturing liquid crystal display devices. In such manufacturing methods, first, a resin seal is formed so as to provide an opening for injecting liquid crystal material on the edge of one substrate among a pair of glass substrates provided with attached electrodes, and spacers are dispersed on the other substrate to maintain a spacing (gap of predetermined size between the substrates. Thereafter, both substrates are adhered and heated to cure the resin seal and produce the panel. This panel is placed in a container under reduced pressure, to produce a vacuum within the panel with the liquid crystal material touching the opening. Finally, the liquid crystal material is injected into the panel by returning the interior of the container to normal pressure.

Since the injection device must be enlarged and the injection time lengthened in the aforesaid vacuum injection method when the display surface area is large, a more efficient sealing method was determined to replace the aforesaid method.

Countermeasures to eliminate the previously described disadvantages are disclosed in Japanese Laid-Open Patent Application Nos. 61-190313 and 9-127528. The liquid crystal display manufacturing methods described in these publications first form a resin seal on a substrate, drip liquid crystal material onto the substrate, press another substrate to adjust a desired inter substrate gap, and subsequently harden the resin seal. Accordingly, the previously mentioned vacuum injection method is not required.

These published methods include the following disadvantages, however. That is, the method disclosed in Japanese Laid-Open Patent No. 61-190313 provides that the resin seal is cured when the substrates are pressed together to form a uniform gap therebetween. The liquid crystal material dropped inside the resin seal have fluidity, and since the resin seal is in the uncured stage there may be dislocation of the substrate when pressure is applied which may remain even when the resin seal is later cured, thus presenting another disadvantage to those occurring when the vacuum injection method is used. Japanese Laid-Open Patent No. 9-127528 proposes a method using a thermoplastic photo-setting re(sin having a softening point between room temperature and the N-I point of the liquid crystal material. The N-I point of the liquid crystal material is approximately 100° C. In this way material having a softening point at a low temperature make possible the softening of the resin seal under normal usage conditions due to heat given off by backlighting, or the closed interior of a room or automobile. Accordingly, the softened resin seal component within the liquid crystal material may elute, such that the softened resin seal forms a thin film on the interface between the liquid crystal material and the substrate, thereby reducing the reliability of the display and causing defects in the orientation of the liquid crystals.

OBJECTS AND SUMMARY

In view of the previously described disadvantages, an object of the present invention provides a liquid crystal light modulating device capable of controlling a uniform inter substrate gap to provide a high quality display, and a method for manufacturing same.

Another object of the present invention is to provide a liquid crystal light modulating device capable of efficiently and simply sealing liquid crystal material between substrates, and a method for manufacturing same.

At least one of these objects are attained by the liquid crystal light modulating device reflecting one of aspects of the present invention. The liquid crystal light modulating device comprises a pair of substrates at least one of which is a transparent substrate, liquid crystal material interposed between the pair of substrates, spacers for maintaining a predetermined gap between the pair of substrates, and resin structural members arranged in a predetermined arrangement within the display region, and wherein each of said resin structural members is made from a curable resin material as a main component, and forms a macromolecular material having thermoplasticity after curing, and which adheres between the pair of substrates. A resin seal may also be formed at the periphery of the pair of substrates.

The method for manufacturing the liquid crystal display device reflecting one of aspects of the present invention comprises the steps of: producing a plurality of resin structural members by arranging a macromolecular material having a curable resin material as a main component to a thickness greater than a predetermined inter substrate gap on at least one substrate among a first and a second substrate; supplying a liquid crystal material to the surface of at least one substrate among the first and the second substrates; and applying pressure on the first and the second substrates via a pressure member and heating same to adjust the inter substrate gap to a predetermined gap and to adhere the pair of substrates. In addition to these steps, steps of; arranging a resin seal on the periphery of either the first or the second substrate; and curing the resin seal via exposure to light, may be comprised. The other of the substrates used may have a plasticity. A step may be provided to arrange spacers on at least one of the substrates. Adjustment of the inter substrate gap is more readily accomplished by arranging the spacers. When the spacers are mixed beforehand with the liquid crystal material, the liquid crystal material including the spacers may be supplied to the substrate surface.

In the present specification, the part accomplishing light modulation in the liquid crystal light modulation layer interposed between the substrates is deemed the light modulation region. For example, in FIGS. 3 and 4 discussed later, the part circumscribed by the resin seal 26 is deemed as the light modulation region. When a liquid crystal light modulation device is used as a liquid crystal display device, the light modulation region works as a dislay region.

According to the present invention, a uniform inter substrate gap is maintained by supporting a pair of substrates via a resin structure adhered to the top and bottom pair of substrates. Using a material having a curable resin material as a main component as the resin structure reduces elution of impurities to the liquid crystal material, and suppresses the degradation of optical characteristics of the display element.

Particularly if the curable resin material is a photosetting type, the liquid crystal material may be dripped onto the substrate after the resin material is cured via exposure to light. This process reduces staining by impurities from the uncured resin structure material within the liquid crystal material. This process further reduces the period of tackiness and improves production efficiency. Heating the resin structural material while applying pressure provides excellent adhesion of the resin structure to both substrates and supports both substrates. Simultaneously injecting and sealing the liquid crystal material and adhering the substrates provides marked improvement of productivity.

Even the use of a thermosetting resin as the curable resin material suppresses elution of impurities to the liquid crystal material. When an electron beam type curing resin is used, polymerization can be achieved without including a polymerization initiator in the resin material, thereby suppressing elution of impurities to the liquid crystal material.

Overlaying the two substrates while the resin seal is in a semi-cured state prevents elution of the resin seal component into the liquid crystal material even when the resin seal material contacts the liquid crystal material. When the resin seal has a ring-like structure, air is not suctioned between the two substrates even when the substrates expand after pressure is applied via a pressure member. When the resin seal is provided on a different substrate than the substrate provided with a resin structure and bot substrates are adhered, heat may be applied to the semi-cured resin seal only when pressure is applied, thereby suppressing a reduction in the adhesion force caused by over curing of the resin seal In the present invention, the substrate may be easily anchored by vacuum suction of one substrate on a base, so as to reliably prevent movement of the substrate due to the friction force generated when the flat plate of pressure member is moved. If a substrate is heated while on a flat plate, the fluidity of the liquid crystal material increases, so as to not only reduce enfolding of air bubbles in the liquid crystal material, but also accelerate softening of the adhesive materials (resin seal, resin structure) to allow adhesion of both substrates in a short period.

A roller shaped pressure member is advantageous to handle, and when a heatable roller type member is used, the adhesive material can be softened by heating the substrate, thereby improving the adhesion force of both substrates.

BRIEF DESCRIPTION OF THE DRAWINGS

These and other objects and features of the present invention will become apparent from the following description of the preferred embodiments thereof taken in conjunction with the accompanying drawings, in which:

FIGS. 6(A)~6(K) illustrate the processes for manufacturing the liquid crystal display device of the second embodiment;

FIGS. 7(A)~7(B) are plan views showing the orientation direction of the orientation layer formed on the first and the second substrates in the second embodiment;

FIG. 8 is a plan view showing the resin seal provided on the second substrate;

FIG. 9 shows the direction of adhering the first and the second substrates;

In the following description, like parts are designated by like reference numbers throughout the several drawings.

DETAILED DESCRIPTION OF THE PREFERRED EMBODIMENTS

Embodiments of the liquid crystal light modulating device and the method for manufacturing the device are described hereinafter with reference to the accompanying drawings.

Figure 1:
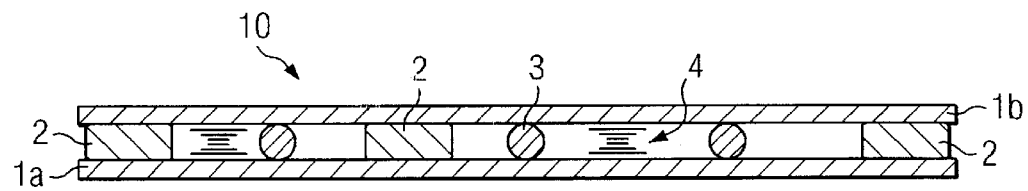
FIG. 1 is a cross section view of a first embodiment of a liquid crystal display device.
Figure 2A:
FIGS. 2(A)~2(F) illustrate the processes for manufacturing the liquid crystal display device of the first embodiment.
Figure 2B:
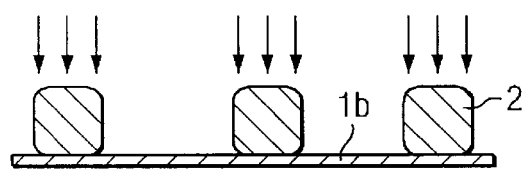
Figure 2C:
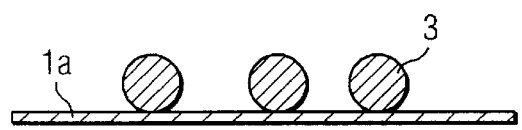
Figure 2D:
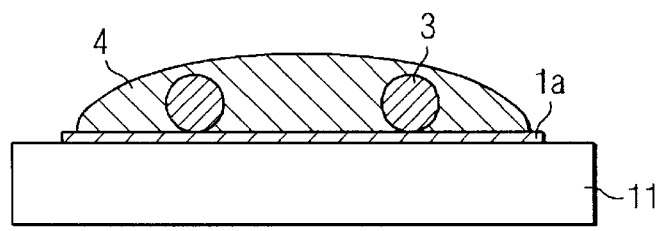
Figure 2E:
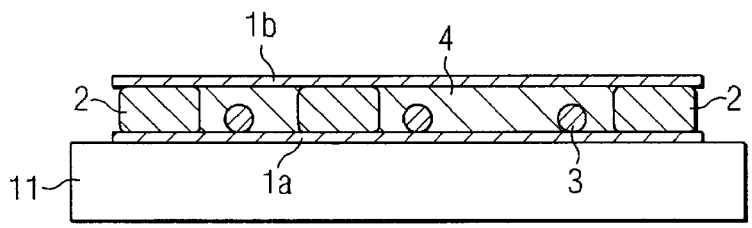
Figure 2F:
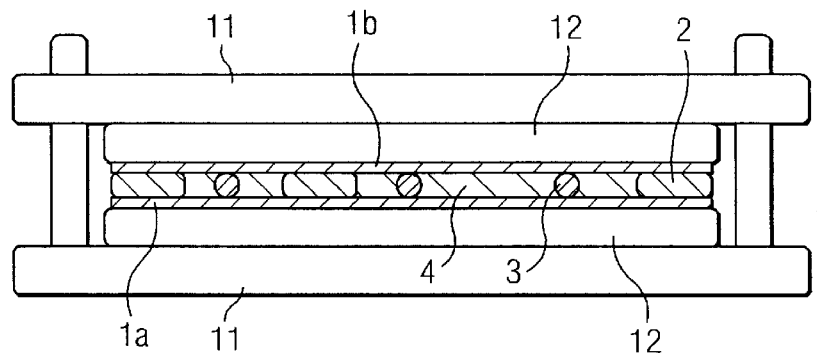
Figure 3:
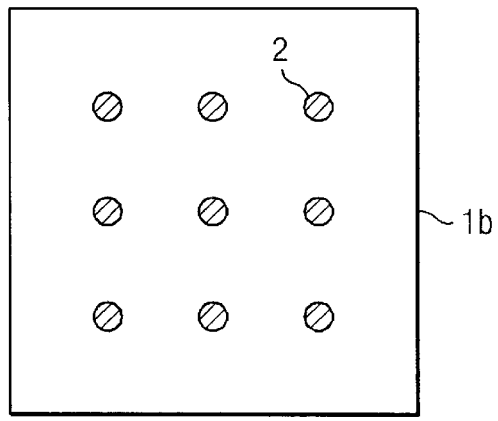
FIG. 3 shows the arrangement of the resin structure of the first embodiment.

First Embodiment (FIGS. 1, 2, 3)

In the first embodiment, a liquid crystal display device 10 which specifies a temperature by the change in color tone using a cholesteric liquid crystal as a liquid crystal material, and the method for manufacturing same are described.

FIG. 1 shows the cross section structure of a liquid crystal display device 10. The liquid crystal display device 10 briefly comprises a first substrate 1a, a second substrate 1b, a resin structure 2, spacers 3, and liquid crystal material 4. The first substrate 1a and the second substrate 1b both are formed of light transmitting material. The liquid crystal material 4 exhibits a cholesteric phase near room temperature, and is filled between the substrates 1a and 1b. The resin structure 2 is provided for supporting the first and the second substrates 1a and 1b. The spacers 3 are used as substrate gap regulating members for the first and the second substrates 1a and 1b.

The liquid crystal display device 10 is manufactured as described below.

First, as shown in FIG. 2(A), a macromolecular material 2' is arranged in a predetermined disposition on the substrate 1b. Then, as shown in FIG. 2(B), the macromolecular material 2' arranged on the substrate is cured to form the resin structure 2. The macromolecular material 2' is a material containing a curable resin material as a main component. The curable resin material is a resin formed by polymerization, and is cured to form a three-dimensional crosslinked structure among the macromolecules, and typical materials having these attributes include monomers, oligamers, and prepolymers.

Photosetting resin material, thermosetting resin material, electron beam setting resin material and the like may be used as the curable resin material. One type of curable resin material or a mixture of more than one type material may be used. Specific examples of usable photosetting resin materials include ultraviolet-curing resin materials formed by adding a photopolymerization initiator to a polymerizable resin material such as an acrylic resin, epoxy resin and the like. Specific examples of usable thermosetting resin materials include resin materials formed by adding a thermopolymerization initiator to a polymerizable resin material such as an acrylic resin, epoxy resin and the like. Specific examples of usable electron beam setting resin materials include polymerizable resin materials such as an acrylic resin, epoxy resin and the like which start polymerization by exposure to an electron beam. In any case, a material which can be softened by heating to a predetermined temperature after curing is used. When using a photosetting resin material as the curable resin material, the material is cured via exposure to light of a suitable wavelength; when a thermosetting resin material is used, the material is cured by heating to a predetermined temperature; and when an electron beam curing resin material is used, the material is cured via exposure to an electron beam.

The macromolecular material 2' may be arranged so as to form a resin structure having a shape, size, spacing, and layer pattern capable of suitably supporting two substrates without hindering the display of the liquid crystal display device after curing. For example, dot-like objects such as circular cylinders, square cylinders, or elliptic cylinders may be arranged at equal spacing based on a predetermined layout rule such as a grating layout. A stripe-like layout with predetermined spacing also may be used. The resin structure formed in dot-like format maintains a higher aperture efficiency for the liquid crystal display device, and increases the adhesion between top and bottom substrates, so as to provide a rigid element able to withstand vibration and bending. When the resin structure is formed in a stripe-like format, the aperture efficiency is reduced compared to the dot-like format, but the adhesion between the resin structure and the substrates is increased due to the increased adhesion surface area, such that the liquid crystal light modulating element itself becomes rigid. A dam may be provided within the liquid crystal layer by forming a stripe-like resin structure, which is advantageous in preventing flow of the liquid crystal material within the liquid crystal layer. FIG. 3 shows a plan view of a circular cylindrical resin structure 2 provided in a grating.

The dot-like resin structure desirably has a maximum width of 200 $\mu$m or less from the perspective of adhesion and display characteristics, and is at least several microns, while more desirably has a maximum width of 10 $\mu$m or more from the perspective of simplicity of production method. Although, to support the top and bottom substrate sufficiently and to have a certain degree of adhesion, the size of the resin structure is a problem, sufficient strength can be obtained as a liquid crystal light modulating element if the percentage of the surface area occupied by the resin structure after heating and pressure against total surface area of the light modulating area is 1% or more. Although the surface area of the light modulating region is reduced in conjunction with the increase in the surface area of the resin structure within the light modulating region, adequate characteristics as a liquid crystal light modulating element are obtained from a practical standpoint if the ratio of the surface area occupied by the resin structure is less than 40%. The line width of a stripe-like resin structure is desirably several microns to 200 $\mu$m, and more desirably 10 $\mu$m to 200 $\mu$m, similar to the dot-like resin structure.

The layout of the macromolecular material 2' may be formed by printing methods for printing a curable resin material on the substrate 1b using a screen or metal mask and applying pressure via a squeegee, methods for ejecting the macromolecular material 2' from a nozzle onto the substrate such as dispenser method and inkjet methods, and transfer methods for supplying the macromolecular material 2' onto a flat substrate or a roller and thereafter transferring the material to the surface of the substrate 1b. The macromolecular material 2' will be suitably disposed such that the height of the cured resin structure 2 is at least greater than the target inter substrate gap.

On the other hand, spacers 3 are applied to the substrate 1a as shown in FIG. 2(C). Although well known conventional materials may be used as the spacer 3, it is desirable that the particles are formed of a hard material that is not deformed by heat or pressure, e.g., spherical particles of inorganic materials such as micro glass fibers, ball-shaped silicone glass, alumina powder and the like, or spherical particles of organic materials such as divinylbenzene crosslinked polymer, polystyrene crosslinked polymer and the like. A resin coating may be provided on the surface of these spacers. The size of the spacer may be optimally set to match the size of the inter substrate gap, and is desirably 1~20 $\mu$m. The ratio of the size of the spacer relative to the resin structure is desirably 1/2 to 1/200. The dispersion of the spacers 3 may be accomplished by well known conventional dispersion application methods, including both wet methods and dry methods.

The substrate 1a on which the spacers 3 have been dispersed is placed on a flat substrate 11, and the liquid crystal material 4 is dripped thereon, as shown in FIG. 2(D). Dripping the liquid crystal material may be accomplished, for example, using methods which ejects the liquid crystal material from a nozzle-like discharge aperture such as a syringe or the like onto the substrate, roll coating methods which coat the liquid crystal material on a substrate positioned on a plate-like support member by supplying the liquid crystal material from a supply aperture to a roll coater via a roller, and bar coat methods which apply a uniform application of liquid crystal material via a bar coater provided with a plurality of discharge nozzles and a glass or rubber blade disposed adjacent to the discharge nozzles on the downstream side.

The spacers 3 may be dispersed in the liquid crystal material 4 beforehand, or may be included in the resin structure 2 itself by being mixed with the macromolecular material 2' beforehand. The spacers 3 also may be included with both the liquid crystal material 4 and the resin structure 2.

Next, the substrate 1b on which the resin structure 2 is formed is overlaid via the liquid crystal material 4 on the substrate 1a which has been supplied with the spacers 3 and the liquid crystal material 4, as shown in FIG. 2(E), both substrates 1a and 1b are held between flat plates 11 and a load is applied while heating to a suitable temperature and holding for a predetermined time. In this way the previously cured resin structure 2 is softened by heating, and pressure is applied toward the substrate 1a such that the resin structure 2 adheres to the substrate 1a.

As shown in FIG. 2(F), when the two substrates are adhered, the substrates 1a and 1b are held between a flexible body 12 between the flat plates 11, so as to apply a reliable pressure force on the substrates 1a and 1b. After the resin structure 2 is formed and the liquid crystal material 4 is supplied, the substrate 1b to which the spacers 3 have been dispersed may be adhered to the substrate 1a.

After a suitable time has elapsed after completion of the adhesion of the resin structure 2, the substrates 1a and 1b may be cooled, and the flat plate 11 removed to produce the liquid crystal display device 10. Cooling is desirably accomplished while under load.

Specific examples of the first embodiment are described below.

EXAMPLE 1

Two plates of glass 7059 (Corning, Inc.) were used as substrates. First, ultraviolet-curing epoxy resin material, Three Bond 3025G (Three Bond Co., Ltd.; glass transition temperature: 140° C.) was printed on a first substrate emptying a screen printing method using screen plate, to arrange the epoxy material in a grating pattern of circular tubes 40 μm in diameter at a pitch of 300 μm. The epoxy resin material was cured via exposure to ultraviolet light, to form a resin structure having a height greater than the target inter substrate gap.

On the other hand, Micropearl SP-230 (Sekisui Fine Chemicals Co., Ltd.) 30 μm in diameter were applied as spacers on the second substrate. Then, the first substrate on which the resin structure was formed was placed on a flat-surfaces substrate and liquid crystal component E44 containing 40 wt % chiral agent CB15 (both produced by Merck. Inc.) was dripped thereon as a liquid crystal material. The flat-surfaced substrate was a flat plate of stainless steel with a polished surface.

Next, the first substrate was overlaid on the second substrate through the liquid crystal material, and both substrates placed between silicone rubber sheets between the stainless steel flat plates provided with polished surfaces, a load of 0.3 kg/cm$^2$ was applied, and the materials were placed in a thermoregulated bath for 10 min at 150° C. to adhere both substrates. Thereafter, power was cut to the thermoregulated bath, and the materials were cooled to room temperature under load.

In this way a liquid crystal display device was produced. This liquid crystal display device generated blue color at 10° C., green color at 20° C., and red color at 30° C. in continuous color variation, and the temperature could be specified by the color tone.

Second Embodiment (FIGS. 4~15)

In the second embodiment, we describe the structure and method of manufacturing a liquid crystal display device 20 for display an image by switching ON/OFF a plurality of pixels.

Figure 4:
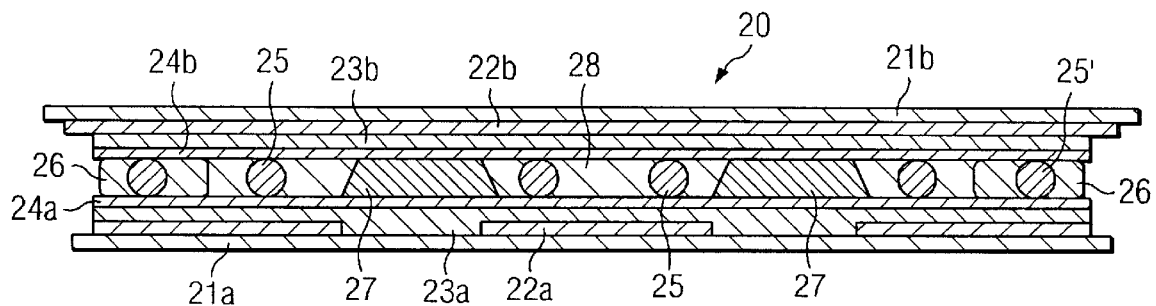
FIG. 4 is a cross section view of a second embodiment of a liquid crystal display device.

FIG. 4 shows a cross section view of the liquid crystal display device 20. A liquid crystal material 28 is filled between a pair of substrates 21a and 21b as a light modulating layer. Transparent electrodes 22a and 22b are formed in a matrix layout on the substrates 21a and 21b, and insulating layers 23a and 23b and orientation layers 24a and 24b are formed over the transparent electrodes as desired. Spacers 25 are provided between the substrates 21a and 21b to maintain the inter substrate gap. The edges of the substrates 21a and 21b are adhered by a resin seal 26 containing the spacers 25'. In the display region is arranged a resin structure 27 adhered to the substrates 21a and 21b, so as to support the substrates 21a and 21b.

In the liquid crystal display device 20, the points of intersections of the matrix-like electrodes 22a and 22b are the display pixels. The region in which light is modulated in the matrix by the liquid crystal material 28 is referred to as the display region, and the resin structure 27 is provided at least in the display region.

The resin structure 27 may have a size, shape, spacing, and layout pattern similar to that of the first embodiment. In the liquid crystal display comprised of pixels via the matrix electrodes of the second embodiment, when a dot-like resin structure is formed, it is advantageous to provide a plurality of individual resin structures per one pixel to increase the strength of the liquid crystal light modulating element in a case where the pixels are relatively large. On the other hand, in a case where the pixels are relatively small, it is suitable and practical to provide one resin structure to support a surface area covering a plurality of individual pixels. It is desirable to increase the aperture efficiency by arranging the dot-like resin structure preferentially between electrodes. When a stripe-like resin structure is formed in a liquid crystal display device comprising pixels formed by matrix electrodes, it is desirable to form the resin structure along the electrodes in bands between electrodes to increase the aperture efficiency as much as possible.

The liquid crystal material 28 may be used in various modes, e.g., twisted nematic (TN) mode, super twisted nematic (STN) mode, ferroelectric liquid crystal (FLC) mode, in-plane switching (IPS) mode, vertical alignment (VA) mode, field induced birefringence (ECB) mode, cholesteric nematic multiphase guest/host mode, macromolecular dispersion liquid crystal mode, cholesteric selective reflectivity mode and the like.

A light transmitting material is desirably used as the substrates 21a and 21b, and if at least one substrate is flexible, the other substrate may be made of an inflexible material such as glass or the like. The substrates 21a and 21b may transmit light of optional wavelength in the visible light range. In the following description, the term transparency has the same definition. If one of the substrates 21a and 21b is transparent when the liquid crystal display device is a reflective type, the other substrate may be non-transparent such as a plastic plate, metal plate, or non-transparent substrate provided with a metal layer, organic layer, or inorganic layer.

Figure 5:
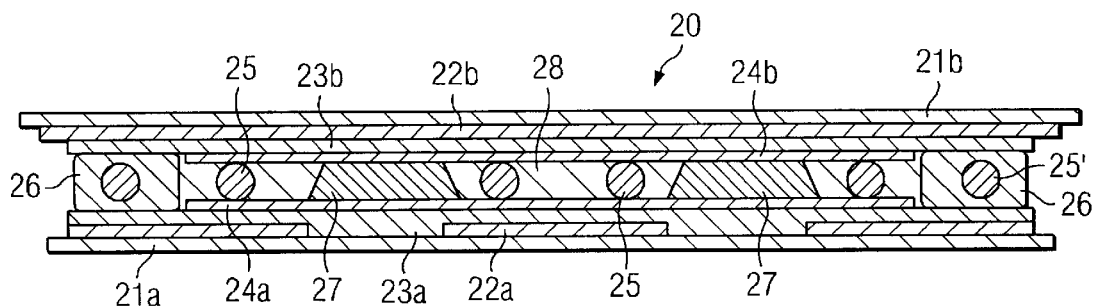
FIG. 5 is a cross section view of a modification of the second embodiment.

FIG. 5 shows a modification of the liquid crystal display device 20, wherein the orientation layers 24a and 24b are provided only in the display region. As shown in FIG. 5, providing orientation layers 24a and 24b only in the display region reduces the amount of orientation layer material used. Since the resin seal 26 directly contacts the substrates 21a and 21b, or the insulating layers 23a and 23b, moisture from the atmosphere is effectively prevented from penetrating the liquid crystal layer through the orientation layers 24a and 24b.

When an ultraviolet-curing resin material or a thermosetting resin material is used as the resin seal 26, curing of the resin seal may be inhibited by the presence of certain types of orientation layers. However, this problem can be avoided by providing the orientation layer only within the display region. The size of the spacers 25' included in the resin seal 26 may be a different size than the spacers 25 dispersed within the display region, but normally problems such as different thickness of the liquid crystal layer do not particularly arise even when the size of the spacers 25' included in the resin seal 26 is the same size as the spacers 25 dispersed within the display region because the thickness of the insulating layer and orientation layer, thickness of the electrodes, and thickness of the liquid crystal layer are sufficiently small compared to the size of the liquid crystal display device in the plane direction.

The aforesaid liquid crystal display device 20 is manufactured as described below.

Figure 6A:
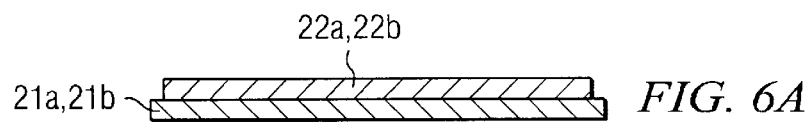
Figure 6B:
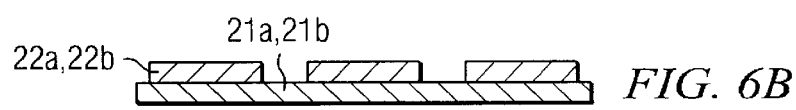

First, as shown in FIGS. 6(A) and 6(B), the transparent electrodes 22a and 22b are formed in a predetermined pattern on the substrates 21a and 21b. Commercial substrates with attached transparent electrodes such as NESA glass and the like may be used. At least one of the substrates 21a and 21b is flexible. In the process for adhering the substrates described later, the substrate may be appropriately flexed in the adhesion direction relative to the substrate supported in a plane.

Figure 6C:
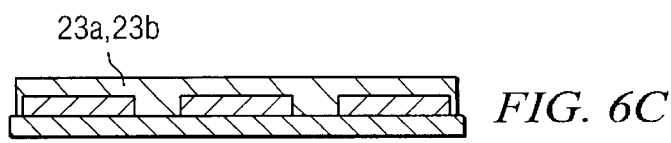
Figure 6D:
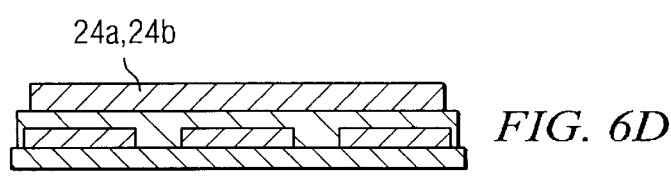

As shown in FIGS. 6(C) and 6(D), a thin organic or inorganic film may be provided on the electrode surface of both substrates as necessary. In the second embodiment, first, the insulating layers 23a and 23b are formed, then the orientation layers 24a and 24b are formed. The insulating layers and orientation layers may be provided as necessary using inorganic materials such as silicon oxide, or organic materials such as polyimide resin via a well known spattering method, spin coating method, or roll coating method. Only one of the insulating layer and the orientation layer may be provided, or both of them may be formed on only one substrate. The orientation layer may be subjected to a rubbing process as necessary.

Then, the spacers 25 are dispersed on the substrate 21b, and the resin seal 26 is applied to the edges of the substrate 21b, as shown in FIGS. 6(G) and 6(H). The provision of the resin seal 26 seals the liquid crystal material within the liquid crystal display device, and supports a broad area of both substrates in combination with the resin structure, so as to uniformly support the inter substrate gap over the entire liquid crystal display device.

The material of the resin seal 26 is not specifically limited insofar as the material is capable of sealing the liquid crystal material within the liquid crystal display device, but it is desirable that the resin used is an ultraviolet-curing resin or a thermosetting resin. Particularly when thermosetting resin such as epoxy resin and the like is used as the resin seal, the seal remains highly airtight for a long period. The resin seal 26 may be formed of the same macromolecular material as the resin structure 27.

The resin seal 26 is formed outside the display region on the electrode surface of the substrate by a method which discharges resin from the tip of a nozzle onto the substrate such as a dispenser method or inkjet method or the like, a printing method which uses a screen plate or metal mask or the like, or a transfer method for forming resin in a predetermined shape on a flat plate or roller, and subsequently transferring the resin onto the substrate 21b.

The resin seal 26 may be formed, for example, in a continuous ring outside the display area. In the present embodiment, as described later, since the liquid crystal material is dripped onto at least one substrate and a second substrate is adhered thereon, the liquid crystal material can be loaded between the substrates without providing an aperture in the resin seal 26 for injecting or removal of the liquid crystal material, or an aperture may be provided in the resin seal 26. After loading the liquid crystal material, the aperture may be sealed using ultraviolet-curing resin. The line thickness of the resin seal 26 is desirably 10~1000 $\mu$m.

The resin seal 26 may contain the spacers 25' therein. The size of the spacers 25' included in the resin seal 26 may be the same size as the spacers 25 dispersed in the display region.

In the present embodiment, the resin seal 26 and the resin structures 27 are provided on the mutually different substrates so that the material and method of forming the resin seal 26 can be easily selected to be different from those of the resin structures 27. For example, a fine resin structure 27 may be formed within the display region using a screen or metal mask, while using a dispenser to form the resin structure outside the display region so as to reduce the amount of resin used to the minimum necessary. A resin may be selected for fineness and adhesion as the resin structure 27 within the display region, and a resin material having long-term reliability and high airtightness may be selected as the resin seal 27 to prevent external impurities from mixing with the liquid crystal material 28. Of course, resins may be provided on the same substrate.

The resin seal 26 may be formed of the same resin material as the resin structure 27, and the processing can be simplified when the resin seal 26 and the resin structure 27 are formed on the same substrate via the same method. Forming the resin seal 26 and the resin structure 27 at the same time reduces the processing time to a minimum.

After the substrates are produced but before they are adhered, the substrate 21b is placed on a heatable flat base such as a hotplate 30 capable of vacuum suction, and the substrate 21b is heated. Heating the substrate 21b reduces the viscosity of the high viscosity liquid crystal material, so as to minimize trapped air bubbles between the substrates when the substrates are overlaid. The temperature to which the substrate is heated may be suitably set, but a temperature above the transition temperature of the liquid crystal material to the isotropic phase increases the fluidity of the liquid crystal material and reduces component change to the liquid crystal material due to the position of the substrate, and avoids producing display irregularities. When the resin seal is in a semi-cured state prior to adhering the two substrates, the two substrates can be adhered reliably. For example, when a thermosetting resin material is used as the resin seal material, the resin seal can be rendered in a semi-cured state via heating using the hotplate 30. In the semi-cured state, part of the resin material is cured and fluidity and surface tackiness are reduced, and when a solvent is included in the resin seal, the solvent component included in the resin seal is partially evaporated by the heating to reduce the fluidity and surface tackiness, and the shape collapses to produce adhesion when pressure is applied.

When a thermosetting resin material is used as the resin seal, the curing temperature of the resin seal may match or approach the softening temperature of the resin structure, so as to achieve processing in a single-stage heating process, and greatly improve production efficiency. The absolute value of the difference between the softening temperature of the resin structure and the curing temperature of the thermosetting resin used as the resin seal is desirably 15° C. or less, and more desirably 10° C. or less.

Figure 10:
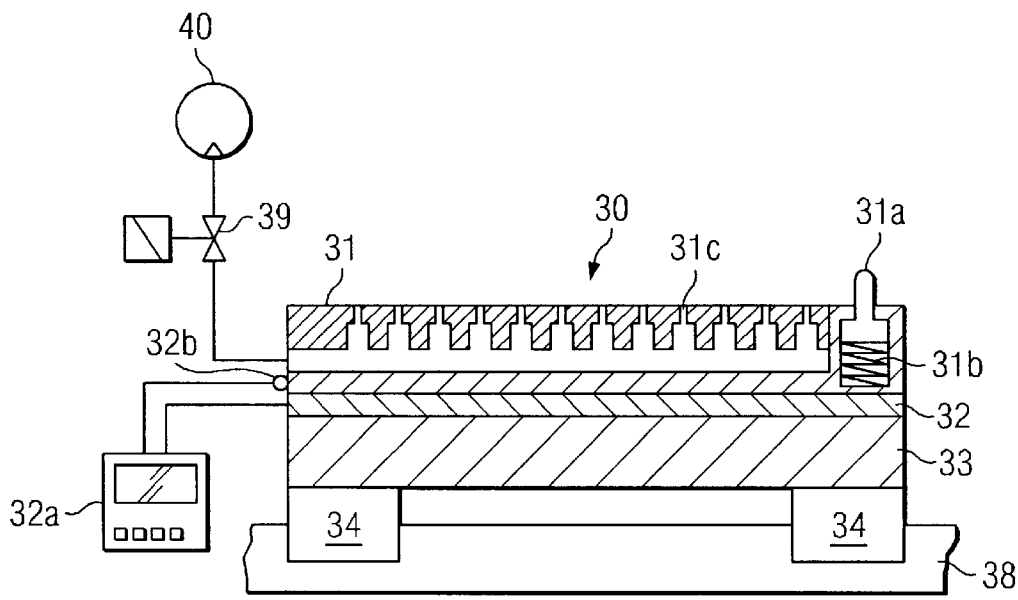
FIG. 10 is a cross section view of a hot plate in the liquid crystal display device manufacturing apparatus.

FIG. 10 shows the construction of a hotplate 30 capable of vacuum suction, and is an example of a heatable flat base. As shown in FIG. 10, the hotplate 30 comprises a suction table 31 provided with a plurality of suction holes 31c used for vacuum suction to fixedly support a substrate which is the object to be heated, a blade type heater 32 fixedly mounted to the back surface of the suction table 31, and a heat shielding blade 33 formed of baking material or ceramic material. Each suction hole 31c is a through hole to the interior of the suction table 31, and is connected to a vacuum pump 40 via an electromagnetic valve 39. Since the substrate is fixedly supported via the air suction from the suction holes 31c, the substrate 21b remains fixed without bending due to thermal expansion even when the flexible substrate 21b is heated, so as to heat the substrate 21b without irregularity.

Figure 6E:
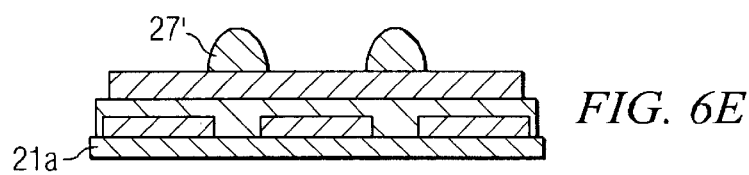
Figure 6F:
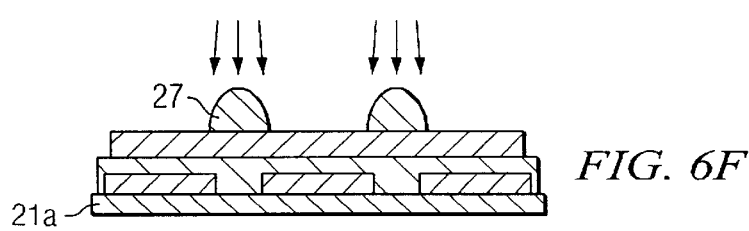

On the other hand, a curable resin material 27' is formed in a predetermined layout on the substrate 21a, as shown in FIG. 6(E), and the curable resin material 27' is cured to form the resin structure 27, as shown in FIG. 6(F). A photosetting resin material, thermosetting resin material, or electron beam curing resin material may be used as the curable resin material 27' similar to that described in the first embodiment, insofar as the cured material has a softening temperature below the softening temperature of the substrate 21a.

The substrate 21a on which is formed the resin structures 27 are adhered to the substrate 21b on which is formed the spacers 25 and the resin seal 26.

FIGS. 6(J) and 6(K) show the adhesion of the substrates. When the two substrates are adhered, at one of the substrates 21a and 21b is heated to cure the resin structure 27. As shown in FIG. 6(J), liquid crystal material 28 is dripped on the edge of the substrate 21a fixedly attached on the hotplate 30, and the edge of the substrate 21b is overlaid on the edge of substrate 21a on the side which received the dripped liquid crystal material 28. Then, the substrate 21b is flexed so as to raise the edge on the opposite side of the substrate 21b, and the substrate 21b is pressed against the substrate 21a via a pressure member so as to be overlaid on and press the liquid crystal material 28. The pressure member which presses against the substrate 21b is desirably a heating roller; FIG. 6(J) shows an example in which a pressure roller 51 and an pressing/heating roller 52 disposed downstream therefrom apply pressure on the substrate 21b.

The substrate 21a is placed on the hotplate 30 which has been heated to a predetermined temperature beforehand so that the surface bearing the orientation layer 24a is facing upward, and the liquid crystal material 28 is dripped on the edge of the substrate 21a. The liquid crystal material 28 may be deposited in an amount greater than the surface area circumscribed by the resin seal 27 and the resin structure 27.

The resin seal 26 is desirably in a semi-cured state until the pair of substrates are overlaid. The semi-cured state restricts elution of the resin seal into the liquid crystal material.

After adhesion, the pair of substrates 21a and 21b are held by a pair of flat panels 75, a load is applied and they are heated to a suitable temperature which is maintained for a suitable time in the same manner as described in the first embodiment. When a time has elapsed to achieve adequate adhesion, the adhered substrates are cooled, and the flat substrates are removed to obtain the liquid crystal display device. It is desirable that cooling is accomplished under load.

An example of an adhesion device used for adhering the substrates is described below.

Figure 11:
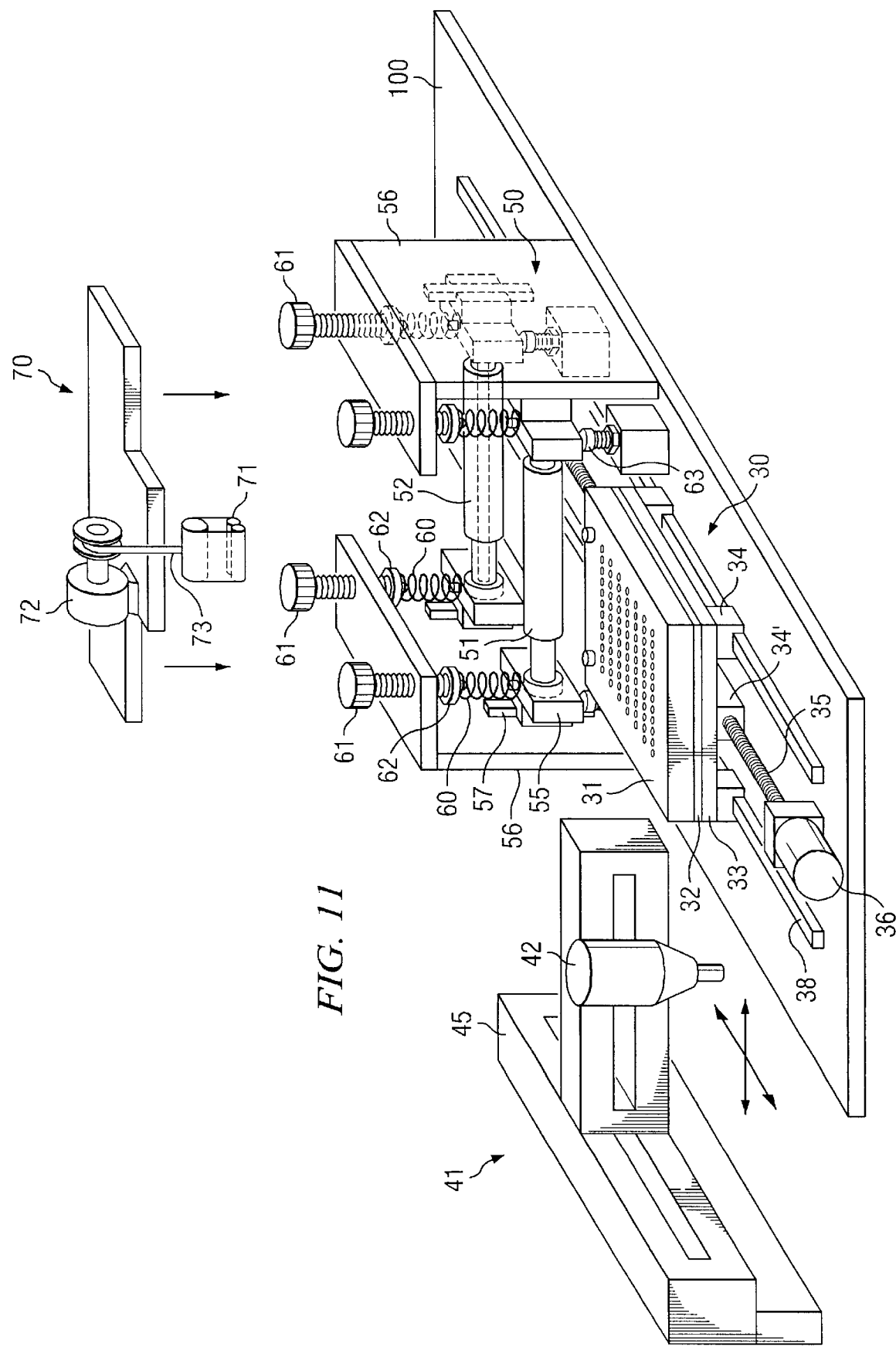
FIG. 11 is a perspective view of the adhesion device including the hot plate.
Figure 12:
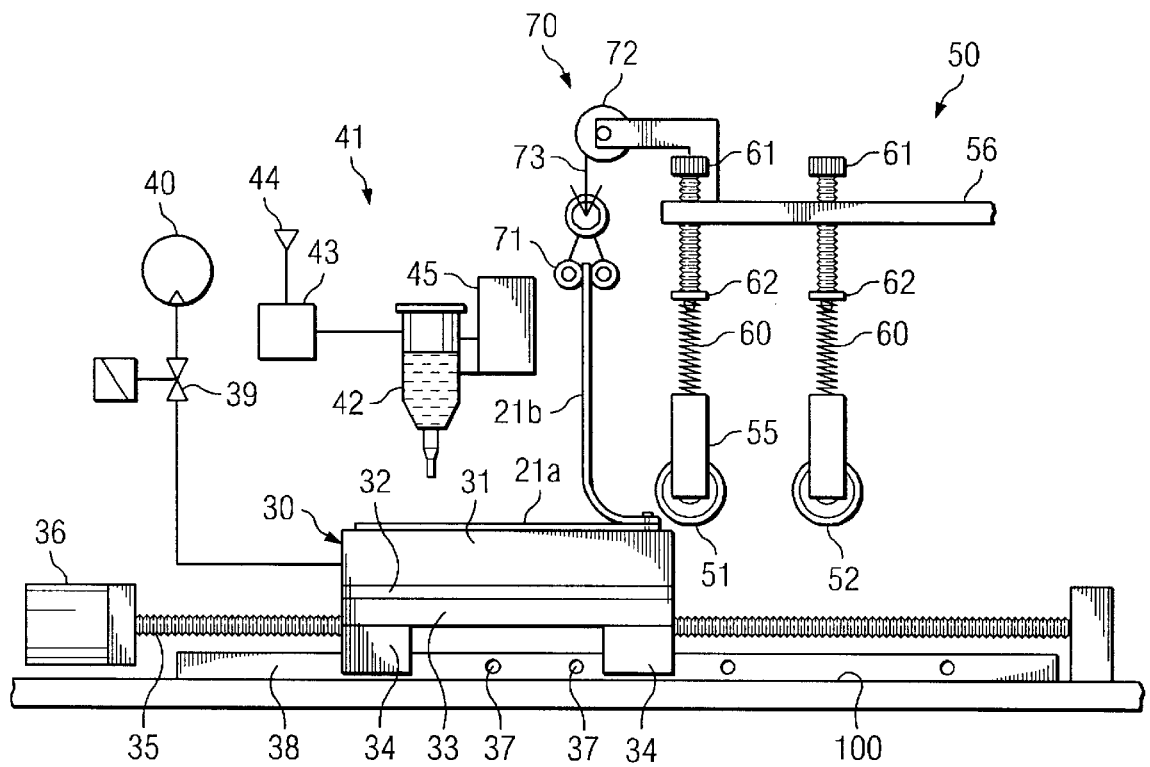
FIG. 12 is a brief frontal view of the adhesion device.

FIG. 11 shows an exterior view of an adhesion device. FIG. 12 shows the adhesion of the pair of substrates 21a and 21b by such a device. This adhesion device comprises a hotplate 30 for mounting and moving the substrate 21a, a discharge unit 41 for discharging a measured amount of the liquid crystal material 28, a pressure heating unit 50 for applying pressure and heating the two substrates 21a and 21b, and a holding unit 70 for holding the trailing edge of the second substrate 21b.

The hotplate 30, as shown in FIG. 10, is provided with an LM block 34 which slides on an LM rail 38 provided on the top of a base 100 (refer to FIG. 11) on the bottom surface of the heat shielding plate 33, and a nut block 34' screwed on a ball screw 35 having a servo motor or speed control motor as a drive source 36. The block 34' screwed onto the ball screw 35 moves reciprocatingly along the rail 38 integratedly with the hotplate 30 and the block 34 based on the forward and reverse rotation of the ball screw 34'.

As shown in FIG. 10 the suction table 31 is provided with a pin 31a for positioning the substrate 21a. When the hotplate 30 slides to a position opposite the pressure/heating roller 52 and the pressure roller 51 provided on the pressure/heating unit 50 described later, a coil spring 31b provided at the back of the pin 31a is compressed, and the pin 31a drops under the roller pressure so as to not impart a load on the pressure roller 51 and the pressure/heating roller 52.

In the hotplate 30, the substrate 21a is fixedly supported by air suction from the suction holes 31a as shown in FIG. 10, and since no member is required to press the substrate 21a from above, the construction is advantageous from the standpoint of simplifying the device construction and preventing soiling. Even, for example, a film substrate does not expand. When the substrate is fixed in place by pressing down from above the plate, the edges of the substrate are supported so as to not hinder movement of the pressure roller to adhere the substrates, and it becomes difficult to maintain the entire substrate flat particularly when a flexible and large substrate is used.

Finally, a heat sensor 32b is provided near the suction table 31, and the ON/OFF switching of the heater 32 is controlled by a thermal regulator 32a connected to the heat sensor 32b, so as to control the temperature of the suction table 31.

A position sensor 37 (refer to FIG. 12) such as a photosensor or limit switch or the like is provided near the LM rail 38 to vary the speed or stop the hotplate 30 at a predetermined position, and the position sensor 37 generates control signals which are transmitted to the drive source 36.

The discharge unit 41 comprises a cylinder 42 for accommodating the liquid crystal material in its interior and for discharging the liquid crystal material from a nozzle, a vacuum source 44 for supplying air to the interior of the cylinder 41, a control device 43 for adjusting the amount of discharge of liquid crystal material from the cylinder 42 by controlling the vacuum source 44, and an X-Y robot mechanism 45 for running and stopping the control device 43 and the cylinder 42 at optional positions above the suction table 31.

The pressure/heating unit 50 is provided with a pressure roller 51 and a pressure/heating roller 52 as shown in FIGS. 11 and 12, and the rollers 51 and 52 apply pressure and heat on the substrates 21a and 21b toward the hotplate 31 when the substrates 21a and 21b arrive opposite the rollers 51 and 52 via the movement of the hotplate 30.

Figure 13:
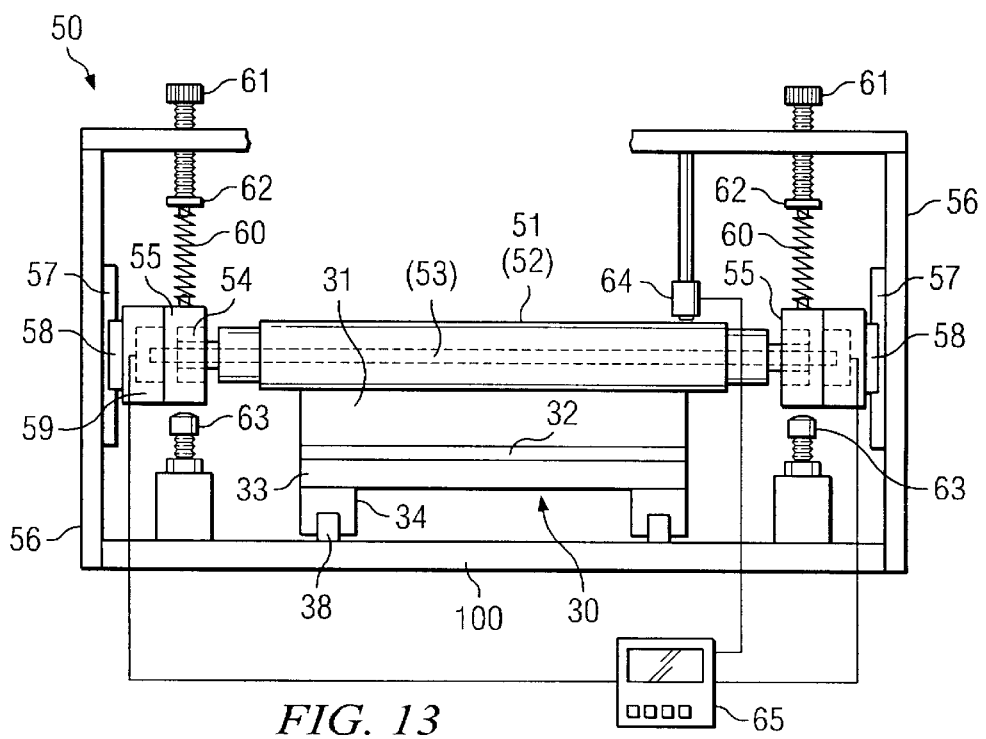
FIG. 13 is a brief side view of the adhesion device.

The bilateral ends of the pressure roller 51 are mounted on bearing holders 55 via bearing 54, as shown in FIG. 13. A support plate 56 is mounted on the top of the base 100, and each bearing holder 55 is connected via the block 59 connected to the LM block 58 which slides on the LM rail 57 mounted on the support plate 56. In this way the pressure roller 51 is slidably supported directly above the hotplate 30.

Above the bearing holders 55 are provided a spring 60 for pressing the bearing holder 55, and an adjustment bolt 61 for adjusting the tightness of the spring 60. The adjustment bolt 61 is screwed into a threaded hole provided in the support plate 56, and presses against the spring 60 via a stopper 62 provided at the tip of the adjustment bolt 61. Rotating the adjustment bolt 61 changes the compression of the spring 60, so as to adjust the pressure applied by the pressure roller 51 to equalize the pressure on the substrates 21a and 21b. Below the bearing holders 55 are provided a stopper 63 for stopping excessive pressure. The pressure force of the pressure roller 51 is desirably set so as to be less than the pressure force of the pressure/heating roller 52.

The pressure/heating roller 52 and the surrounding support mechanism is identical to the pressure roller 51 and the surrounding support mechanism. The pressure/heating roller 52 has a hollow structure, and the surface of the pressure/heating roller 52 is heated by a rod-like heater 63 built into the hollow portion. A non-contact type or contact type heat sensor 64 is disposed near the surface of the pressure/heating roller 52, and the surface temperature of the pressure/heating roller 52 is controlled by a thermal regulator 65 connected to the heat sensor 64.

The surfaces of the pressure roller 51 and the pressure/heating roller 52 are desirably smooth with separation characteristics, e.g., a silicone rubber layer is suitable.

The substrate support unit 70 comprises a pair of support rollers 71 for supporting the trailing edge of the substrate 21b, and a motor 72 for feeding out and reeling in a wire 73 connected to the leading edge of the support roller pair 71. When the leading edge of the hotplate 30 is positioned opposite the pressure roller 51, the motor 72 starts feeding out the wire 73, such that the operation of lowering support roller pair 71 is connected to the operation of moving the hotplate 30.

Specific examples of the second embodiment are described below.

EXAMPLE 2

The previously mentioned glass 7059 was used as a first substrate on which an ITO (indium tin oxide) layer 200 nm in thickness was formed by a spattering method. A flexible transparent conductive film FST-5352 (Sumitomo Bakelite Co., Ltd.) was used as the second substrate. This substrate also had an ITO layer formed thereon. The ITO on these substrates was subjected to photolithographic processing to form a band like transparent electrode pattern with an electrode pitch of 350 µm and an electrode width of 300 µm.

Then, a thin film 1000 angstroms in thickness was formed on the transparent electrodes of both substrates via a spin coat method using polysilazane L120 (Tonen Corp.), the substrates were heated for 2 hr at 120° C. in a thermoregulated bath, then an insulating layer was formed by heating for 3 hr in a thermal and moisture regulated bath at 85% humidity. Next, a thin film only 500 angstroms in thickness was formed on the insulating layer of both substrates via a spin coat method using an orientation layer material AL4552 (JSR, Ltd.), and heated in a thermoregulated bath for 2 hr at 165° C.

After heating, the orientation layer on both substrates was subjected to a rubbing process. As shown in FIGS. 7(A) and 7(B), the rubbing direction R was 45° in the clockwise direction from the lengthwise direction of the band-like electrode 22a of the substrate 21a, and 45° in a counterclockwise direction on the second substrate 21b.

Then, Micropearl SP-2045 with a diameter of 4.5 µm was dispersed on the second substrate as spacers. The dispersion of the spacers was accomplished by dispersing the spacers in a solvent comprising water and isopropanol in a ratio of 1:1 (volume ratio), spraying the material from a spray bottle onto the orientation layer of the second substrate. Next, Micropeari SP-2045 with a diameter of 4.5 µm was mixed in a seal material Struct-Bond XN-21-S (Mitsui Toatsu Chemicals, Inc.) was applied as a spacer using a liquid crystal resin application device (dispenser) model MLC-III (Musashi Engineering, Inc.). At this time, the resin seal 26 has a ring like structure surrounding the display region as shown in FIG. 9.

After applying the resin seal, the second substrate was suction mounted on the hotplate 30 shown in FIG. 10, and heated for 30 min at 80° C.

Then, a resin structure was formed on the first substrate. An ultraviolet-curing resin (epoxy resin), i.e., UV resin T-470/UR-7092 (Nagase-Chiba, Ltd.; glass transition temperature: 144° C.), was used as the curable resin material. This ultraviolet-curing resin material was printed in a gating having a diameter of 50 µm and a pitch of 350 µm via a screen printing method. Next, the resin structure was exposed to integrated light of 4000 mJ/cm$^2$ using a 4 kW high voltage mercury lamp model HMW-244-11CM (ORC Manufacturing Co., Ltd.) to cure the resin material and form a resin structure having a height greater than the target inter substrate gap. Adhesion of these substrates was accomplished using the adhesion device shown in FIGS. 11~13.

When adhering the substrates, the first substrate was suctioned on the top of the hotplate 30 preheated to 80° C. with the surface bearing the orientation layer facing upward, and liquid crystal material was dripped onto the edge of the first substrate the amount of dripped liquid crystal material was more than sufficient to cover the area enclosed by both substrates. The liquid crystal material comprising 0.7 wt % chiral material S811 (Merck, Inc.) in a liquid crystal material ZLI1565 which is used in TN mode (Merck, Inc.) is used.

As shown in FIG. 9, the edges of the substrates were overlaid on the side having the liquid crystal material such that the band-like transparent electrode 22b on the second substrate 21b intersects the transparent electrode 22a on the first substrate 21a, i.e., the rubbing direction R on the orientation layers intersect oppositely. Then, the hotplate was moved to rotate the silicone rubber roller 51 and 52, and deploy the liquid crystal material 28 while adhering the second substrate 21b on the first substrate 21a.

At this time, both silicone rubber rollers 51 and 52 were set at a surface temperature of 160° C., and the resin material 27 was softened via the silicone rubber roller 52, while pressure was applied to a standard value via the spacers 25 to form the inter substrate gap. The substrates 21a and 21b adhered by the silicone rubber roller 51 and 52 were sandwiched through silicone rubber sheets by the stainless steel pair of flat plates with polished surfaces, and a load of 0.3 kg/cm$^2$ was applied and the materials were placed in a thermoregulated bath at 150° C. for 90 min. Thereafter, the power source was turned OFF to the thermoregulated bath, and the substrates were cooled to room temperature under load. This process produced a liquid crystal display device.

The liquid crystal display device operating in TN mode and manufactured in the above described manner maintained a uniform inter substrate gap, and has extremely few display irregularities.

EXAMPLE 3

Example 3 is a liquid crystal display device produced using a resin structure formed of a thermosetting curable resin material. In other aspects, example 3 is identical to example 2, and only the dissimilar aspects are described below.

A thermosetting epoxy resin material, XN21-S (Mitsui Chemicals Co., Ltd.; glass transition temperature 138° C.) was used as the curable resin material. After printing the resin material using a screen identical to that used in example 2, the substrates were heated in a thermoregulated bath at 150° C. for 90 min to cure the resin. Adhesion of the two substrates was accomplished using the device shown in FIGS. 10~13. The surface temperature of the heating roller was set at 160° C.

The liquid crystal display device produced as described above maintained uniform inter substrate gap, and had extremely few display irregularities.

EXAMPLE 4

Example 4 is a liquid crystal display device produced using a resin structure formed of an electron beam curing resin material. In other aspects, example 4 is identical to example 2, and only the dissimilar aspects are described below.

Figure 17A:
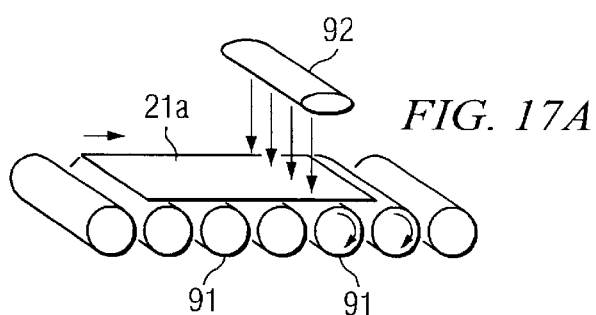
FIGS. 17(A)~17(B) are perspective views of the manufacturing process of a fifth embodiment of the liquid crystal display device.
Figure 17B:
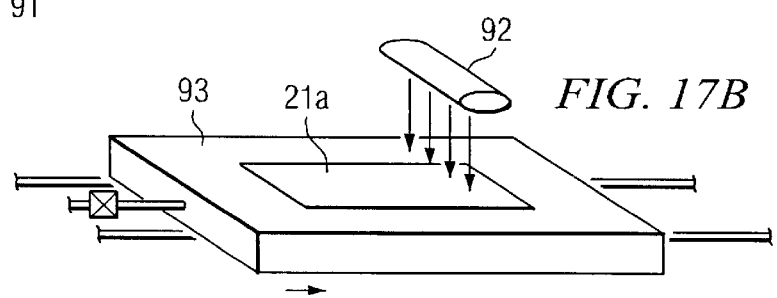

An epoxy acrylate resin material, R-011 (Nippon Kayaku Co., Ltd.; glass transition temperature: 142° C.) was used as the curable resin material. After printing the resin material on the first substrate 21a using a screen identical to that used in example 2, the substrate 21a was placed on a conveyor comprising a plurality of rollers 91 as shown in FIG. 17(A), and cured by passing through an electron beam exposure area via electron beam emitted from an electron beam lamp 92. As shown in FIG. 17(B), the first substrate 21a may be fixedly suctioned on the top of the vacuum suction plate 93, and passed through the exposure region of the electron beam lamp 92 to cure the material.

Adhesion of the substrates was accomplished using the device shown in FIGS. 10~13. The surface temperature of the heating roller was set at 160° C.

The liquid crystal display device produced as described above maintained uniform inter substrate gap, and had extremely few display irregularities.

Figure 14:
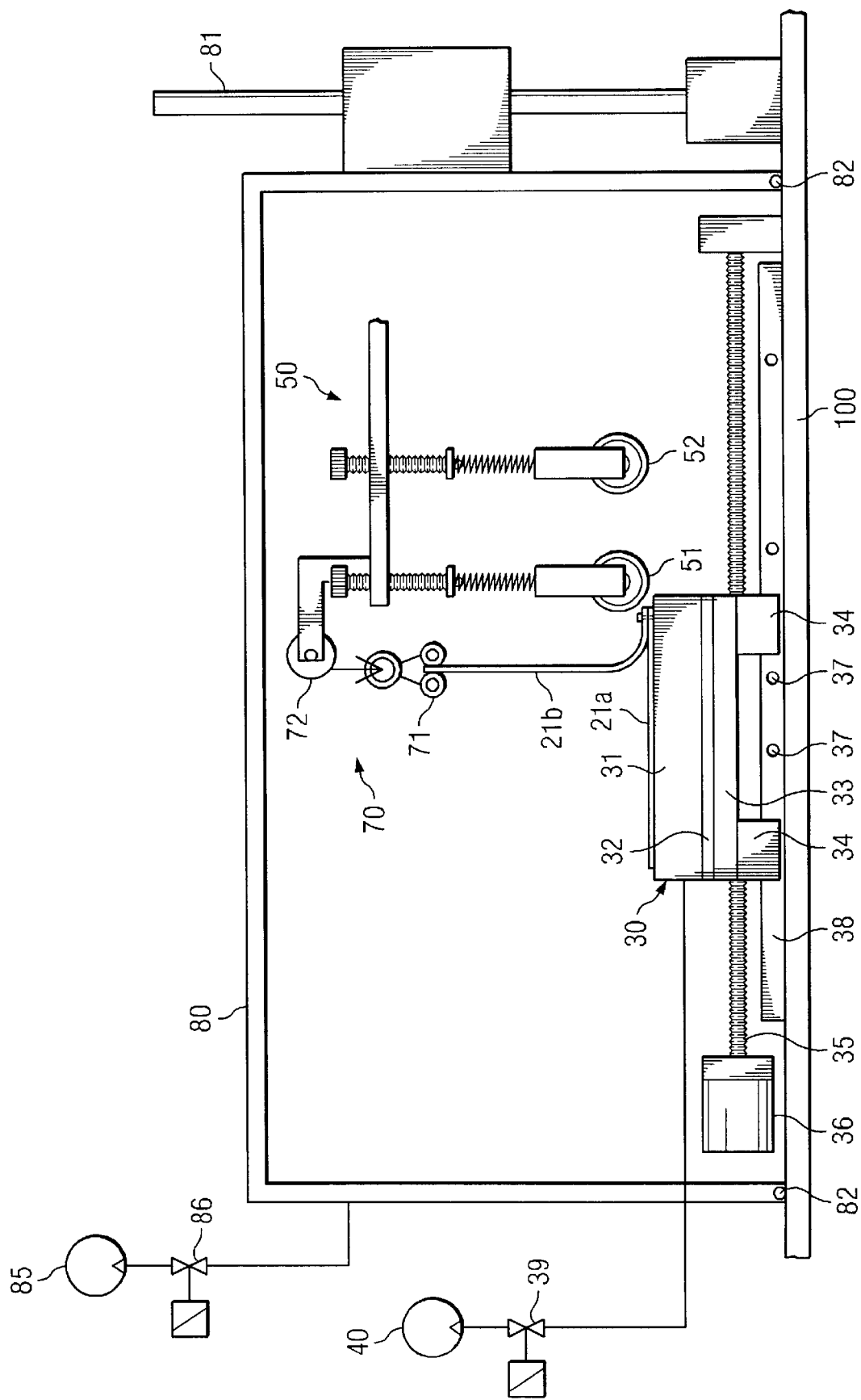
FIG. 14 is a brief structural view showing an improvement of the adhesion device.

Improved Adhesion Device (FIG. 14)

FIG. 14 shows an improvement of the adhesion device (FIGS. 10~13). This device houses the hotplate 30, pressure/heating roller 50 and the like in a vacuum chamber 80 above the base 100. The vacuum chamber 80 is supported so as to be lifted by an elevator mechanism 81, and airtightness is maintained via an O-ring 82 between the base 100 and the vacuum chamber 80. The interior of thew vacuum chamber 80 is connected to a vacuum pump 85 via an electromagnetic valve 86, to reduce the pressure within the chamber.

Using this improved device, the enclosing of impurities and air bubbles between the substrates 21a and 21b (within the liquid crystal material 28) can be reliably prevented the interior of the vacuum chamber 80 can be cleanly maintained.

Figure 15:
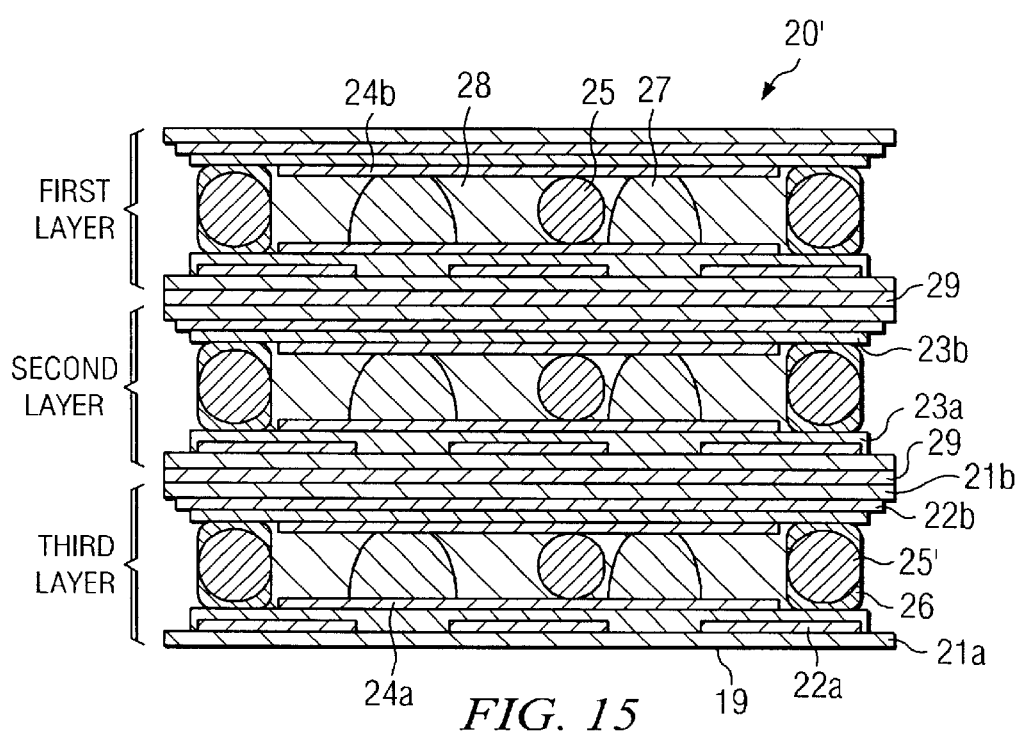
FIG. 15 is a cross section view of a third embodiment of a liquid crystal display device.
Figure 16A:
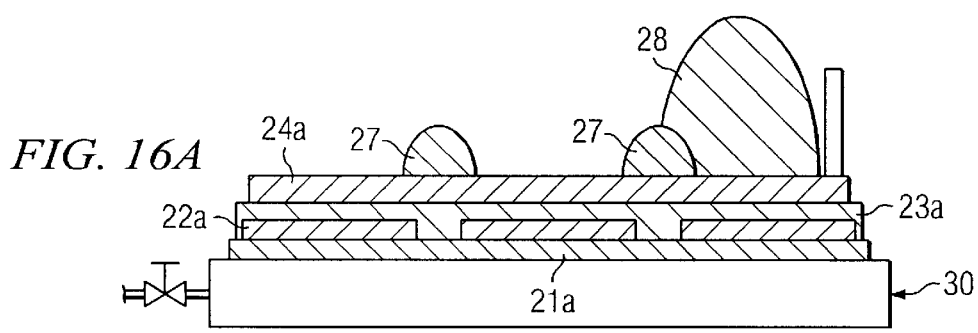
FIGS. 16(A)~16(B) illustrate the processes for manufacturing the third embodiment.
Figure 16B:
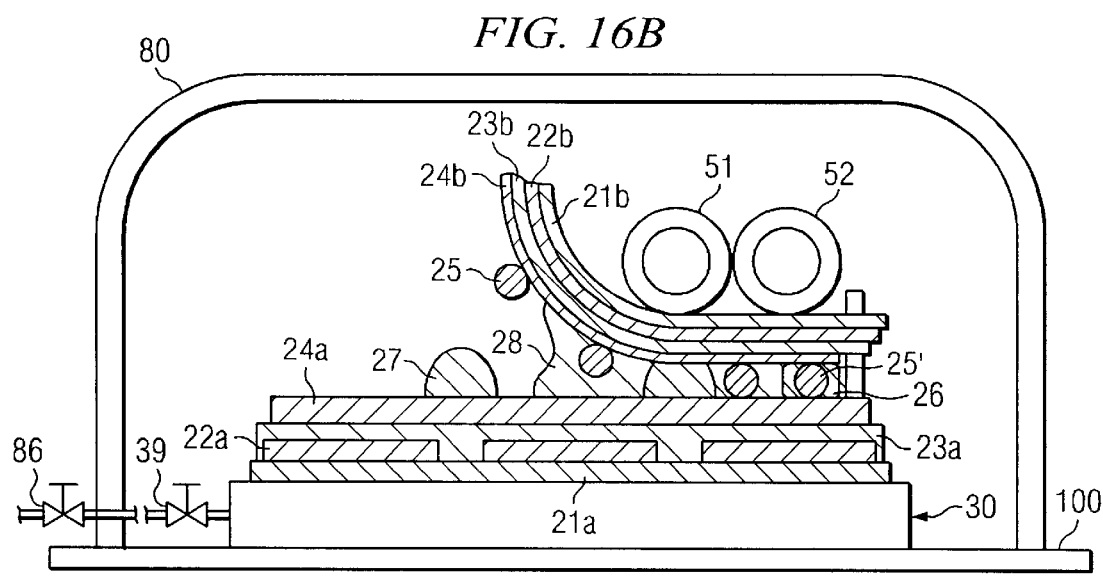

Third Embodiment (FIGS. 15, 16(A), 16(B))

The third embodiment relates to a reflective type liquid crystal display device 20' using a liquid crystal materials which exhibits a cholesteric phase at room temperature, and comprising a three-layer liquid crystal panel holding liquid crystal material having different selective reflective wavelengths for each layer.

FIG. 15 shows a cross section of the liquid crystal display device 20'. The third embodiment is identical to the second embodiment with the exception that a total of three layers of flexible substrates 21a and 21b are used, the liquid crystal material 28 exhibits a cholesteric phase at room temperature, and the liquid crystal display panel comprises three layers of substrate pairs 21a and 21b.

In the third embodiment, the liquid crystal material included in each layer has a different selective reflective wavelength. A color display is achieved by selectively setting the reflective state and transmission state of each layer. For example, a full color display is achieved by laminating liquid crystal display elements using liquid crystal materials adjusted to reflect red, green, and blue. Only the aspects of dissimilarity with the second embodiment are described below.

FIGS. 16(A) and 16(B) show part of the process for manufacturing the liquid crystal display device 20', and show only aspects which differ from the second embodiment. First, the pre-adhered substrates 21a and 21b are produced in the same way as the second embodiment. Then, the substrate 21a is placed on the vacuum suction hotplate 30 of the adhesion device of FIG. 15, and the liquid crystal material 28 is applied onto the edge of the substrate 21a, as shown in FIG. 16(A). Then, as shown in FIG. 16(B), and with the vacuum chamber 80 in a vacuum state, the substrate 21b is overlaid on the substrate 21a at the edge with the liquid crystal material 28 so that the band-like electrodes 22a and 22b mutually intersect, and both substrates are adhered by the pressure roller 51 and the pressure/heating roller 52.

In this way, after the substrates 21a and 21b of each layer are adhered, and an adhesive 29 is dripped between each layer to cement the layers and to achieve alignment which prevents positional dislocation of the pixels of each layer. A curable resin material such as a thermosetting resin, photosetting resin and the like, or a thermoplastic resin may be used as the adhesive 29. The layers also may be laminated using a pressure sensitive adhesive.

A light absorbing layer is provided on the substrate 21a of the three layer on the surface of the substrate 21a which doe not have the transparent electrode. The surface provided with the light absorbing layer is the lowermost surface when the three layers are adhered. The light absorbing layer also may be provided on the side of the substrate 21a provided with the transparent electrode 22a. This arrangement is most desirable in that providing such a layer between the substrate 21a and the transparent electrode 22a prevents a rise of the applied voltage, but such a layer also may be provided between the transparent electrode 22a and the liquid crystal material 28. When provided on the outer side of the substrate 21a, the light absorbing layer may be formed by applying a black lacquer.

Specific examples of the third embodiment are described below.

EXAMPLE 5

Two flexible and transparent conductive films, FST-5352 were used as substrates, and band-like transparent electrodes were formed on each film in the same manner as in example 2. An insulating layer and an orientation layer were provided on the electrode surface of each substrate identical to example 2. The orientation layer rubbing process was not performed.

The liquid crystal material 28 was a mixture of chiral material S811 added to nematic liquid crystal E44 (both produced by Merck, Inc.) at a rate of 32 wt % (first layer), 30 wt % (second layer), and 25 wt % (third layer) so as to achieve a selective reflective wavelength of the liquid crystal layer of each layer such that the first layer (uppermost layer in FIG. 16) wavelength was 490 nm (blue), the second layer (intermediate layer) wavelength was 560 nm (green), and the third layer (lowermost layer) wavelength was 680 nm (red).

The spacers of the first layer were SP205 with a diameter of 5 µm, the spacers of the second layer were SP207 with a diameter of 7 µm, and the spacers of the third layer were SP209 with a diameter of 9 µm (all products of Sekisui Fine Chemical Co., Ltd.), and were applied beforehand on one substrate of each layer to achieve inter substrate gaps of 5 µm, 7 µm, and 9 µm, respectively. The resin seal was an ultraviolet-curing resin (epoxy resin) UV Resin T-470/UR-7092, and contained spacers of 5 µm, 7 µm, and 9 µm for the respective layers.

After the resin seal was applied on the substrate via a screen printing method, it was exposed to integrated light of 4000 mJ/cm$^2$ using a 4 kW high voltage mercury lamp model HMW-244-11CM.

On the other substrate of each layer, a resin structure was formed which had a height greater than the height of the target inter substrate gap of each layer using the ultraviolet-curing resin UV Resin T-7092 identical to that of example 2.

The substrates 21$a$ and 21$b$ before adhesion were produced in the same manner as in the second embodiment, and the substrate 21$a$ was vacuum suction on the hotplate 30, and the liquid crystal material 28 was applied to the edge of the substrate 21$a$. The, the substrate 21$b$ was placed in the adhesion device, the vacuum chamber was evacuated, and the substrate 21$b$ was overlaid at the edge on the side to which the liquid crystal material 28 was applied, such that the band-like electrodes 22$a$ and 22$b$ mutually intersected, and adhesion was accomplished via the adhesion device shown in FIG. 14.

In this way, after adhering the substrates 21$a$ and 21$b$ forming each layer, a previously prepared two-part thermosetting silicone adhesive SE1740A and SE1740B (both products of Toray Dow Corning Silicone Co., Ltd.) was dripped between each layer to cement the layers and to achieve alignment which prevents positional dislocation of the pixels of each layer, then the three layers were cemented by heating to 80° C.

A black resist CFPR BK-730S (Tokyo Ohka Kogyo Co., Ltd.) was applied to the surface of the third layer substrate 21$a$ which was not provided with a transparent electrode 22$a$, to form a light absorbing layer 19. The surface provided with the light absorbing layer 19 was adhered as the lowermost layer when the three layers were laminated.

In this way the reflective type liquid crystal display device 20' is transparent in a focal conic state when a relatively small pulse voltage is applied to the layers, and is selectively reflective of each color in a planar state when a relatively large pulse voltage is applied, and displays halftones when an intermediate pulse voltage is applied, and maintains a display in a non-voltage application state in all cases. An extremely bright and highly visible full color display is possible by suitably switching ON/OFF each layer.

Other Embodiments

The liquid crystal light modulating device and the method for manufacturing same of the present invention are not limited to the previously described embodiments, and may be variously modified within the scope of the specification.

In particular, the specific materials of the liquid crystal, substrate, adhesives and like materials are optional. Manufacturing devices other than that shown in FIGS. 10~14 may, of course, be used as the manufacturing device.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A liquid crystal light modulating device comprising:
   a pair of substrates, at least one of which is a transparent;
   a liquid crystal material interposed between the pair of substrates;
   a plurality of spacers for maintaining a predetermined gap between the pair of substrates; and
   a plurality of resin structural members arranged in a predetermined arrangement within a display region, each of said resin structural members being made from a curable resin material as a main component, and, after curing, forming a macromolecular material having, thermal adhesiveness against the pair of substrates, and adhering to both of the pair of substrates after being heated to take on the thermal adhesiveness.

2. The liquid crystal light modulating device as claimed in claim 1, further comprising:
   a resin seal formed between said pair of substrates at a periphery of the display region to prevent the liquid crystal material from leaking from the display region.

3. The liquid crystal light modulating device as claimed in claim 2, wherein said resin seal is made of a material identical to those of said resin structural members.

4. The liquid crystal light modulating device as claimed in claim 2, wherein said resin seal is made of a material different from those of said resin structural members.

5. The liquid crystal light modulating device as claimed in claim 2, wherein said resin seal contains parts of said spacers therein.

6. The liquid crystal light modulating device as claimed in claim 1, wherein each of said resin structural members has a column shape.

7. The liquid crystal light modulating device as claimed in claim 1, wherein each of said resin safe structural members has a strip shape.

8. The liquid crystal light modulating device as claimed in claim 1, wherein at least one of said substrates is flexible.

9. The liquid crystal light modulating device as claimed in claim 1, wherein said curable resin material is a photosetting resin material.

10. The liquid crystal light modulating device as claimed in claim 1, wherein said curable resin material is a thermosetting resin material.

11. The liquid crystal light modulating device as claimed in claim 1, wherein said curable resin material is an electron beam setting material.

12. The liquid crystal light modulating device as claimed in claim 1, wherein each of said substrates has a plurality of electrodes thereon, and wherein said plurality of electrodes defines a plurality of pixels within the display region.

13. The liquid crystal light modulating device as claimed in claim 12, wherein a plurality of resin structural members are provided per one pixel.

14. The liquid crystal light modulating device as claimed in claim 12, wherein a plurality of pixels are provided per one resin structural member.

15. The liquid crystal light modulating device as claimed in claim 1, wherein the macromolecular material takes on the thermal adhesiveness at a temperature lower than a softening temperature of the pair of substrates.

16. The liquid crystal light modulating device as claimed in claim 1, wherein the macromolecular material takes on the thermal adhesiveness at a temperature higher than a curing temperature of the curable resin material.

* * * * *